(12) United States Patent
Johnson

(10) Patent No.: US 6,722,144 B2
(45) Date of Patent: Apr. 20, 2004

(54) CYLINDRICAL AIRFLOW DAMPER (75) Inventor: Ronald Miles Johnson, Jeffersontown, KY (US)

(73) Assignee: General Electric Company, Schenectady, NY (US)

( * ) Notice: Subject to any disclaimer, the term of this patent is extended or adjusted under 35 U.S.C. 154(b) by 221 days.

(21) Appl. No.: 09/682,664

(22) Filed: Oct. 3, 2001

(65) Prior Publication Data
US 2003/0061826 A1 Apr. 3, 2003

(51) Int. Cl.[7] ............ F25D 17/04; F25D 17/06
(52) U.S. Cl. ............................. 62/187; 62/408
(58) Field of Search ..................... 62/187, 408

(56) References Cited
U.S. PATENT DOCUMENTS

| | | | |
|---|---|---|---|
| 4,009,591 A | | 3/1977 | Hester |
| 4,689,966 A | | 9/1987 | Nonaka |
| 5,092,136 A | * | 3/1992 | Kang ................. 62/408 |
| 5,765,388 A | * | 6/1998 | Jeon ................. 62/408 |
| 5,870,900 A | | 2/1999 | Mohebbi et al. |
| 5,896,749 A | | 4/1999 | Livers, Jr. |
| 5,901,562 A | | 5/1999 | Tunzi et al. |
| 5,992,166 A | | 11/1999 | Tremblay |
| 6,032,480 A | | 3/2000 | Kim |
| 6,199,400 B1 | | 3/2001 | Banicevic et al. |
| 6,209,622 B1 | | 4/2001 | Lagace et al. |
| 6,240,735 B1 | * | 6/2001 | Kolson et al. ........ 62/187 |
| 6,318,099 B1 | | 11/2001 | Hwang |

* cited by examiner

Primary Examiner—Kevin Lee
(74) Attorney, Agent, or Firm—H. Neil Houser, Esq.; Armstrong Teasdale, LLP (57) ABSTRACT

An air flow damper assembly is provided. The assembly includes a duct member comprising a first air flow opening therethrough, and a damper disposed within the duct member and including a substantially cylindrical rim for regulating air flow through the first opening.

20 Claims, 6 Drawing Sheets

CYLINDRICAL AIRFLOW DAMPER

BACKGROUND OF THE INVENTION

This invention relates generally to air flow damper mechanisms, and, more particularly, to air flow damper mechanisms for use in refrigeration systems.

Conventionally, multi-compartment refrigerators include a fresh food compartment and a freezer compartment for chilling and preserving food items at respective desired temperatures. Typically, the fresh food compartment is set to a user adjustable setting, and the fresh food compartment is thermostatically controlled to energize a refrigeration circuit (i.e., evaporator, condenser, etc.) to generate cooled air for introduction into the fresh food compartment to maintain the fresh food compartment at specified temperature levels. When the refrigeration circuit is energized, evaporator air is also introduced into the freezer compartment, and the temperature of the freezer compartment is controlled according to a user adjustable damper located in a flow path between the fresh food compartment and the freezer compartment. When the damper is fully closed, air flow from the freezer compartment into the fresh food compartment is substantially prevented, thereby maintaining the cooled evaporator air in the freezer compartment and lowering the freezer compartment temperature. When the damper is fully open, an appreciable amount of air from the freezer compartment flows into the fresh food compartment from the freezer compartment, thereby increasing the temperature of the freezer compartment. Of course, air flow from the freezer compartment to the fresh food compartment affects the frequency at which the refrigeration circuit is energized to maintain the fresh food compartment temperature at a desired temperature.

Typically, the damper is a pivoting plate or baffle located in a duct extending between the fresh food compartment and the freezer compartment. See, for example, U.S. Pat. No. 5,901,562. The plate pivots about an axis in the plane of the plate to obstruct or clear an air flow path through the duct. Conventionally, the damper is moved from a fully closed position to a fully opened position in about a 90° pivot of the plate. As the plate pivots, the area of the passage opened or closed varies approximately sinusoidally. In other words, small changes in damper position can result in large changes in the flow path area in certain positions of the damper, while in other positions of the damper, relatively large changes in position result in almost negligible changes in the flow path area. As such, it is difficult to precisely control the position of the damper to achieve a desired effect, despite sophisticated controls and complex mechanical linkages to position the damper plate.

SUMMARY OF THE INVENTION

In one aspect, an air flow damper assembly is provided. The assembly comprises a duct member comprising a first air flow opening therethrough, and a damper disposed within said duct member and comprising a substantially cylindrical rim for regulating air flow through said first opening.

In another aspect, an air flow assembly for a refrigerator including a fresh food compartment and a freezer compartment is provided. The damper assembly comprises a duct portion comprising a first air flow opening therethrough and adapted for flow communication between the fresh food compartment and the freezer compartment, and a damper in flow communication with said duct portion. The damper comprises a shaft and a substantially cylindrical rim extending radially from said shaft, and the rim is positionable with respect to said opening by rotating said shaft to regulate air flow through said first opening.

In yet another aspect, a refrigerator is provided. The refrigerator comprises a freezer compartment, a fresh food compartment, and an air flow assembly. The air flow assembly comprises a duct portion in flow communication with said freezer compartment and said fresh food compartment, and a damper comprising a longitudinal axis and a radially extending rim rotatable about said longitudinal axis.

In still another aspect, a refrigerator is provided. The refrigerator comprises a freezer compartment, a fresh food compartment, a mullion separating said freezer compartment and said fresh food compartment, and a duct member establishing flow communication between said freezer compartment and said fresh food compartment. The duct member comprises a substantially cylindrical opening accessible to said freezer compartment, and a damper assembly is located in said cylindrical opening and comprises a shaft and a rim radially extending from said shaft. The rim is tapered to obstruct varying portions of said opening as said shaft is rotated.

DETAILED DESCRIPTION

Figure 1:
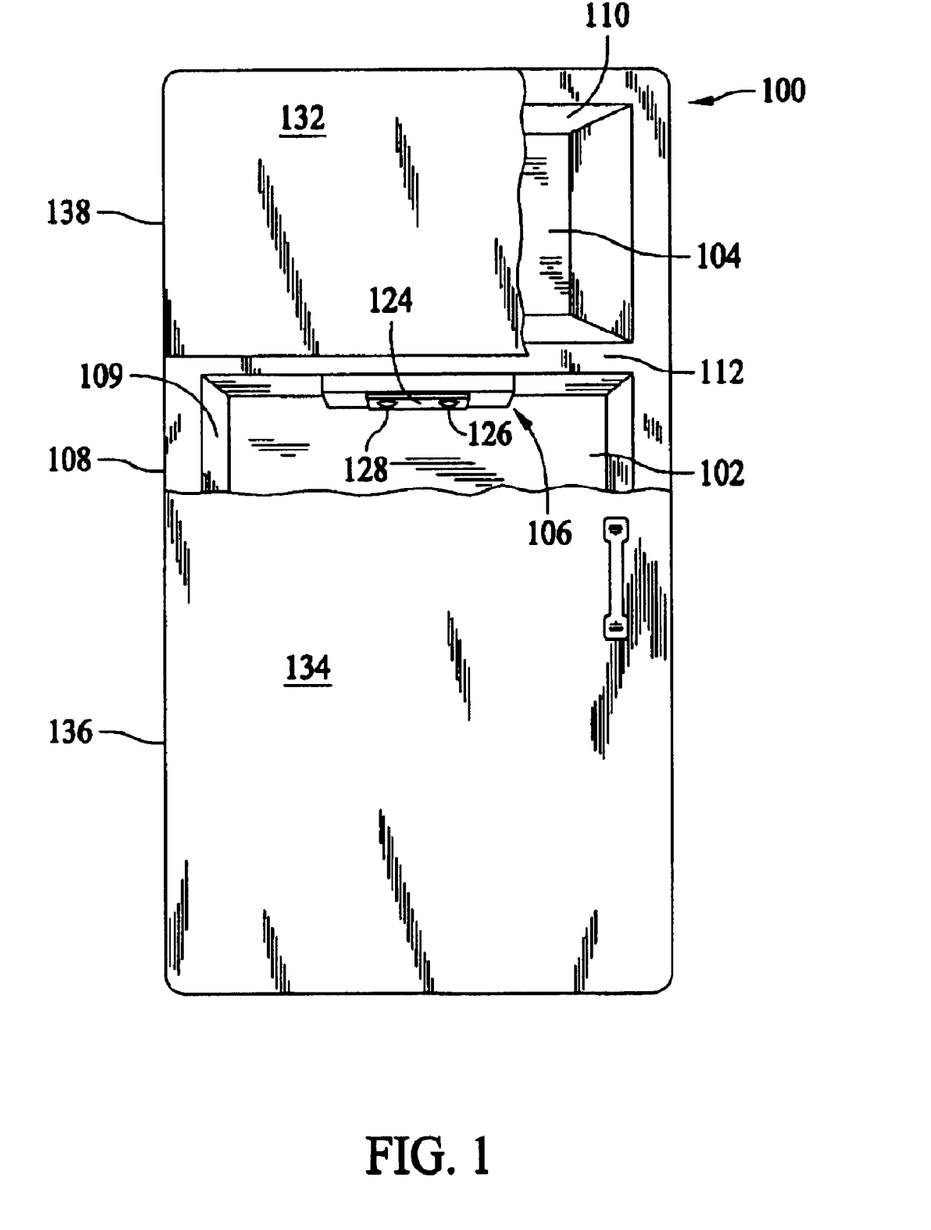
FIG. 1 is a perspective view of a refrigerator partly broken away.

FIG. 1 is a perspective view of an exemplary top-mount refrigerator 100 including a lower fresh food storage compartment 102, an upper freezer storage compartment 104, and an air flow damper assembly 106 through which air flow between fresh food compartment 102 and freezer compartment 104 may be regulated. While air flow damper assembly 106 is described and illustrated in the context of top-mount refrigerator 100, it is contemplated that the benefits of the present invention accrue to other types of refrigerators having more than one refrigeration compartment, including but not limited to side-by-side refrigerators familiar to those in the art. Therefore, refrigerator 100 is but one type of refrigerator in which the present invention may be employed, and is described herein by way of illustration rather than limitation. The invention is not restricted to practice with any particular refrigerator, such as refrigerator 100.

Refrigerator 100 includes an outer case 108 and inner liners 109 and 110. A space between case 108 and liners 109 and 110 is filled with foamed-in-place insulation. Outer case 108 normally is formed by folding a sheet of a suitable material, such as pre-painted steel, into an inverted U-shape to form top and side walls of case 108. A bottom wall of case 108 normally is formed separately and attached to the case side walls and to a bottom frame that provides support for refrigerator 100. Inner liners 109 and 110 are molded from a suitable plastic material to form fresh food compartment 102 and freezer compartment 104, respectively. Alternatively, liners 109, 110 may be formed by bending and welding a sheet of a suitable metal, such as steel. It is understood that a single liner may be employed in lieu of separate liners 109, 110 and a mullion 112 extended between opposite sides of the liner to divide it into a fresh food compartment 102 and a freezer compartment 104. In one embodiment, mullion 112 is formed from a suitable resilient material, such as an extruded acrylo-butadiene-syrene based material (commonly referred to as ABS). Mullion 112, insulation between compartments 102, 104, and a spaced wall of liners separating compartments, sometimes are collectively referred to herein as a mullion wall.

Shelves and slide-out drawers (not shown in FIG. 1) normally are provided in fresh food compartment 102 to support items being stored therein. A temperature of fresh food compartment 102 is adjustable via manipulation of a control interface 124 mounted in an upper region of fresh food storage compartment 102 and coupled to a control unit (not shown) including a microprocessor (not shown). Desired temperature settings and conditions for freezer compartment 104 and fresh food compartment 102 are selectable with dial input selectors 126, 128 extending beneath control interface 124. In one exemplary embodiment, dial selectors 126, 128 are marked with indicia such as warmer, colder, a plurality of gradations between the warmer and colder settings, and an off setting. The dial is rotated to the selected temperature, and the selected setting indicia in one embodiment is visible through control interface 24 so that a user may view current temperature settings. As explained in more detail below, dial selectors 126, 128 regulate an evaporator cycle and air flow between freezer compartment 104 and fresh food compartment 102, respectively.

Shelves and wire baskets (not shown) are also provided in freezer compartment 104, and in further embodiments, an ice maker (not shown) may further be provided in freezer compartment 104 as desired.

A freezer door 132 and a fresh food door 134 close access openings to fresh food and freezer compartments 102, 104, respectively. Each door 132, 134 is mounted on hinges (not shown) that facilitate rotation of doors 132, 134 about respective outer vertical edges 136, 138 between an open position allowing access to the associated compartment and a sealed closed position enclosing the associated storage compartment. In an exemplary embodiment, each of freezer door 132 and fresh food door 134 includes a plurality of storage shelves (not shown) and a sealing gasket (not shown).

In accordance with known refrigerators, known refrigeration components are at least partially maintained in a machinery compartment (not shown) located at the rear of refrigerator 100 for executing a vapor compression cycle for cooling air. The components include a compressor (not shown), a condenser (not shown), an expansion device (not shown), and an evaporator (not shown) connected in series and charged with a refrigerant. The evaporator is a type of heat exchanger which transfers heat from air passing over the evaporator to a refrigerant flowing through the evaporator, thereby causing the refrigerant to vaporize. The cooled air is used to refrigerate one or more refrigerator or freezer compartments as desired. The frequency of refrigeration cycles may be varied with adjustment of air flow damper assembly 106, which determines relative temperatures of fresh food compartment 102 and refrigerator compartment 104.

Figure 2:
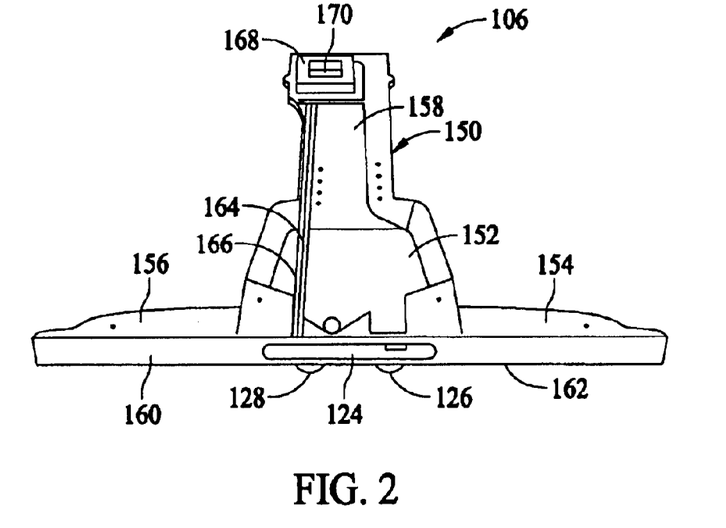
FIG. 2 is a perspective view of an air flow damper assembly for the refrigerator shown in FIG. 1.
Figure 3:
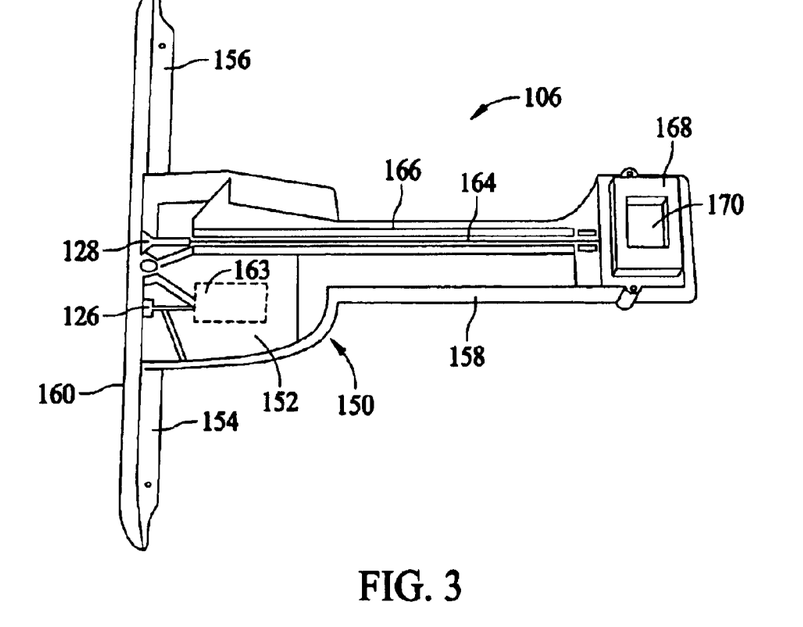
FIG. 3 is another perspective view of the air flow damper assembly shown in FIG. 2.

FIGS. 2 and 3 are perspective views of air flow damper assembly 106 for use in, for example refrigerator 100 (shown in FIG. 1). Damper assembly 106 includes a body 150 defining a control cavity 152 for housing refrigeration control mechanisms and components (not shown). Lateral extensions 154, 156 extend from either side of control cavity 152, and a bridge extension 158 extends rearwardly from control cavity 152, thereby forming a generally T-shaped body 150. Control interface 124 is attached to a front face 160 of body 150, and dial input selectors 126, 128 are accessible through a lower edge 162 of body 150. In one embodiment, body 150 is fabricated from a known plastic material, although in alternative embodiments other materials may be employed to fabricate body 150.

Input selector 126 is operatively coupled to a known thermostatic switch or electronic control mechanism 163 (shown in phantom in FIG. 3) disposed in control cavity 152 coupled to refrigeration components (not shown) and capable of operating the refrigeration components in response to a selected position of input selector 126. In further embodiments, control cavity 152 also includes light assemblies, fixtures and lighting controls (not shown) to illuminate refrigerator compartment 102 (shown in FIG. 1), fan elements(not shown) to assist with air flow through damper assembly 106, and other known components (not shown) that may be desired for particular refrigerator option and features. Control cavity 152 includes appropriate partitions and dividing walls to separate components placed therein as desired.

Input selector 128 is coupled to a control rod 164 disposed m a trough or channel 166 formed by substantially vertical walls extending through control cavity 152 and bridge extension 158. Control rod 164 positions a damper (not shown in FIGS. 2 and 3) inside a duct member 168 disposed on an end of bridge extension 158 and located some distance from body control cavity 152. Duct member 168 includes an opening 170 that is opened, closed, or partially restricted depending on a position of the damper therein. In an illustrative embodiment, assembly 106 is attached to refrigerator mullion 112 (shown in FIG. 1) according to known fastening techniques such that duct member 168 is extended through mullion 112, thereby exposing duct member opening 170 to freezer compartment air at a rear of refrigerator 100 (shown in FIG. 1). Control rod 164 extends forwardly to input selector dial 128 which is positioned toward a front of refrigerator 100. Thus, a direct mechanical linkage is provided between input selector 128 located in a frontal region of refrigerator 100 and a position of the damper within duct member 168 located toward the rear of refrigerator 100.

Figure 4:
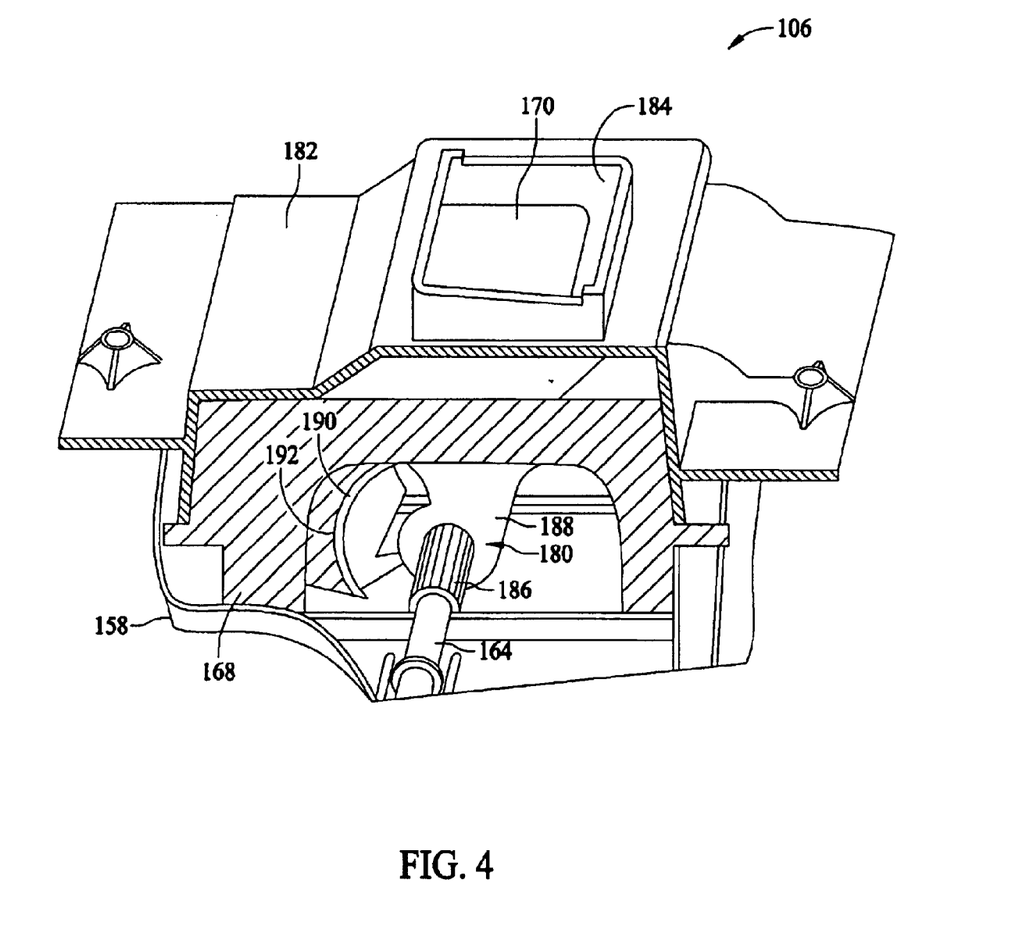
FIG. 4 is a perspective cut away view of a portion of the air flow damper assembly shown in FIGS. 2 and 3.

FIG. 4 is a perspective cut away view of duct member 168 positioned at a distal end of body bridge extension 158 and illustrating a damper 180 located within duct member 168 and in flow communication with opening 170 in a top of duct member 168. A protective hood 182 encloses duct member 168 and damper 180 and further includes an opening 184 in flow communication with opening 170.

Damper 180, in an illustrative embodiment, includes a shaft 186, an irregularly shaped wheel portion 188 extending radially from shaft 186, and a substantially cylindrical rim 190 disposed within a cylindrical shaped opening 192 formed within duct member 168 and in flow communication with duct member opening 170. Damper rim 190 extends arcuately and substantially radially from wheel portion 188 and is positionable within duct member opening 192 to restrict or clear air flow through hood opening 184 and duct member top opening 170 into cylindrical shaped opening 192. Damper control rod 164 is coupled to damper shaft 186 so that damper 180 is rotated as control rod 164 is rotated through manipulation of input selector 126 (shown in FIGS. 2–4). As will become apparent below, cylindrical rim 190 provides more precise control of air flow from freezer compartment 104 (shown in FIG. 1) to fresh food compartment 102 (shown in FIG. 1) in comparison to conventional refrigerator damper assemblies including pivoting plates or baffles positioned in a duct and rotating about an axis through the plate.

In an illustrative embodiment, duct member 168 is fabricated from a lightweight low cost material such as Styrofoam, and damper 180 is fabricated from a durable injection molded plastic material. It is appreciated, however, that in alternative embodiments, other known materials may be equally employed in fabrication of duct member 168 and damper 180 while achieving the benefits of the present invention and without departing from the scope of the present invention.

Figure 5:
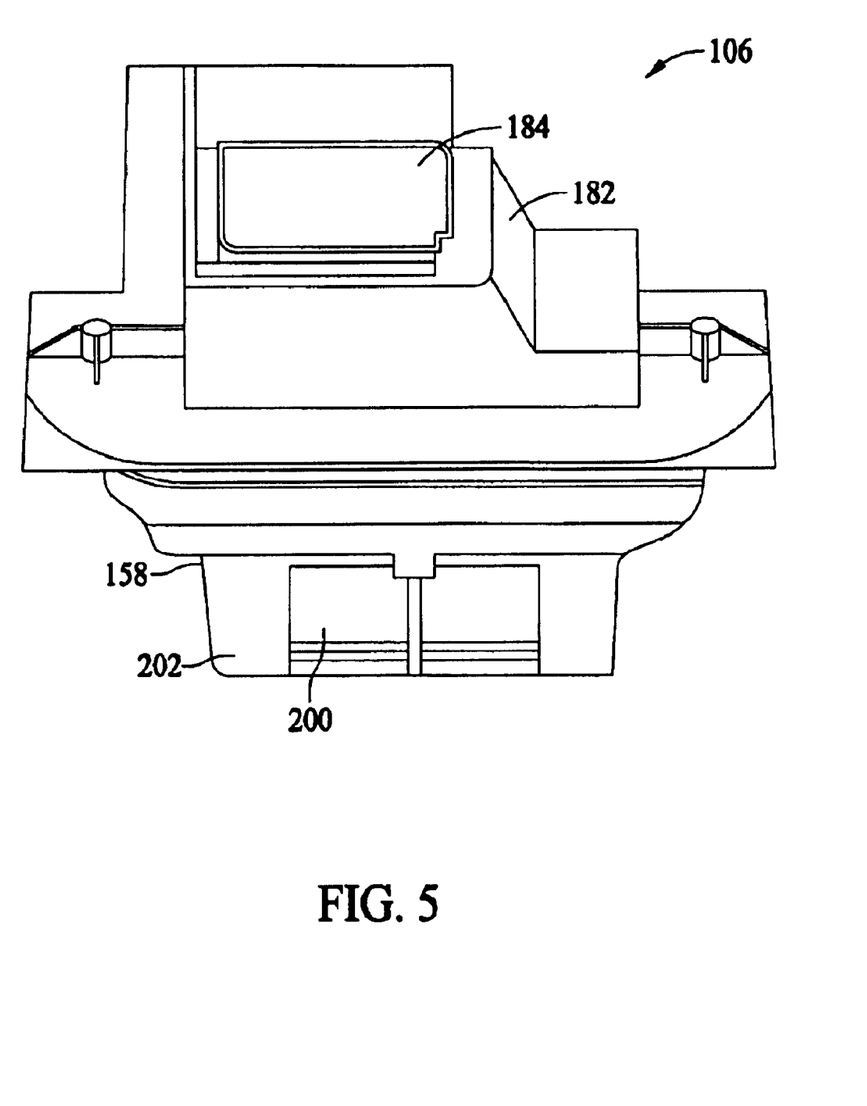
FIG. 5 is a partial rear perspective view of a portion of the air flow damper assembly shown in FIGS. 2–4.

FIG. 5 is a partial rear perspective view of a portion of damper assembly 106 with parts removed. Hood 182 is attached to body bridge extension, thereby enclosing duct member 168 (shown in FIG. 4) and damper 180 (shown in FIG. 4). Hood top opening 184 extends in a substantially horizontal plane at top of hood 182, and duct member top opening 170 (shown in FIGS. 2–4) extends in a substantially horizontal plane beneath hood top opening 184. Duct member top opening 170 is in flow communication with duct member cylindrical opening 192 (shown in FIG. 4), and an opening 200 extends through a rear wall 202 of body bridge extension 158 in a substantially vertical plane. Therefore, when damper 180 is in an open position, air flow is allowed from freezer compartment 104 (shown in FIG. 1) downwardly through hood opening 184 and into duct member top opening 170 in flow communication with duct member cylindrical opening 192, and laterally through opening 192 to opening 200 where air may flow into fresh food compartment 102 (shown in FIG. 1) at the rear of refrigerator 100. When damper 180 is in a closed position, air flow is blocked between hood opening 184 and body bridge extension opening 200. Of course, damper 180 is also selectively positionable between the open and closed positions to regulate air flow through damper assembly 106.

Figure 6:
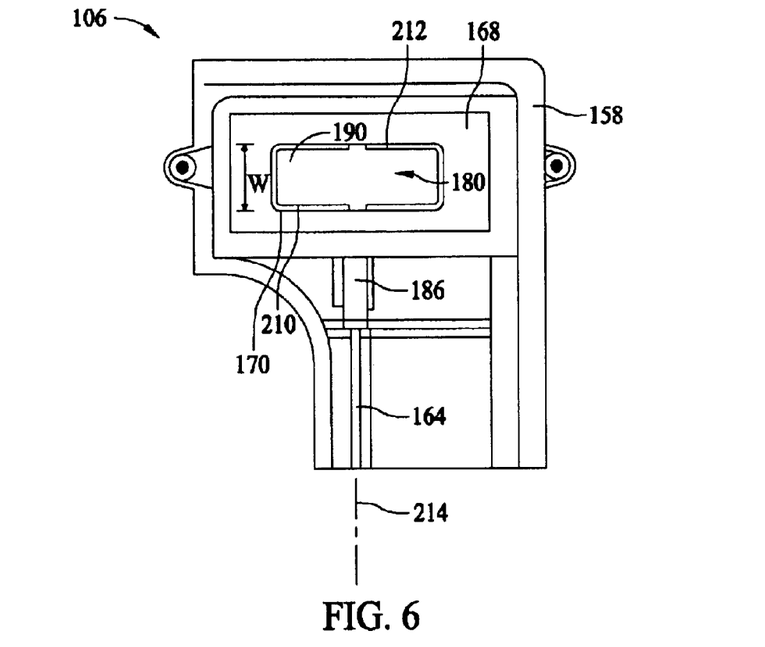
FIG. 6 is a top plan view of the damper assembly shown in FIG. 6 in a closed position and with parts removed.

FIG. 6 is a top plan view of damper assembly 106 with damper 180 in a closed position within duct member 106 and with hood 182 (shown in FIG. 5) removed from body bridge extension 158. Damper cylindrical rim 190 extends across substantially an entire area of duct member opening 170 and therefore generally blocks air flow through opening 170, and consequently Through opening 200 (shown in FIG. 5) in body rear wall 202 (also shown in FIG. 5). Damper 180, and more specifically damper rim 190 includes oppositely extending edges 210, 212 extending for a width that is substantially equal to a width W of duct member opening 170, and edges 210, 212 extend substantially parallel to one another when damper 180 is positioned in the closed position. Damper 180 may be moved from the closed position by rotating control rod 164 through manipulation of dial input selector 128 (shown in FIGS. 1–3) coupled to rod 164, thereby rotating damper cylindrical rim 190 about a longitudinal axis 214 through rod 164 and bearing shaft 186.

Figure 7:
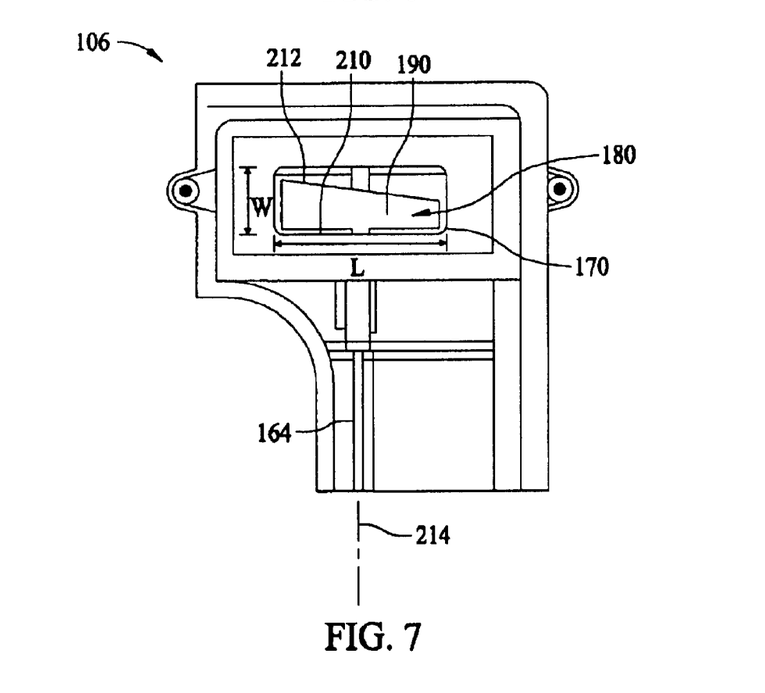
FIG. 7 is a top plan view of the damper assembly shown in FIG. 6 in an intermediate position and with parts removed.

FIG. 7 is a top plan view of damper assembly 106 shown in with damper 180 an intermediate position when control rod 164 is rotated (counterclockwise in FIG. 1) about longitudinal axis 214 and air flow is permitted through duct member opening 170. As illustrated in FIG. 7, damper rim side edge 212 is tapered relative to side edge 210 so that a width of damper rim 190 is less than width W of duct member opening 170, and the width of damper rim generally decreases along a length L of duct member opening 170. As such, an unblocked area of duct member opening 170 by damper rim 170 is gradually increased or decreased as damper 180 is rotated in each direction about longitudinal axis 214. Thus, sinusoidal changes in opening area associated with conventional pivoting plate or baffle dampers is avoided, and precise control of air flow through damper assembly 106 is achieved without sophisticated and costly controls.

While the illustrated embodiment includes a tapered rim in a duct opening 170 of substantially constant width, it is contemplated that in alternative embodiments, duct member opening 170 may itself be tapered and used with a cylindrical damper rim, with or without tapered side edges 210, 212 to achieve at least some of the benefits of the present invention.

Figure 8:
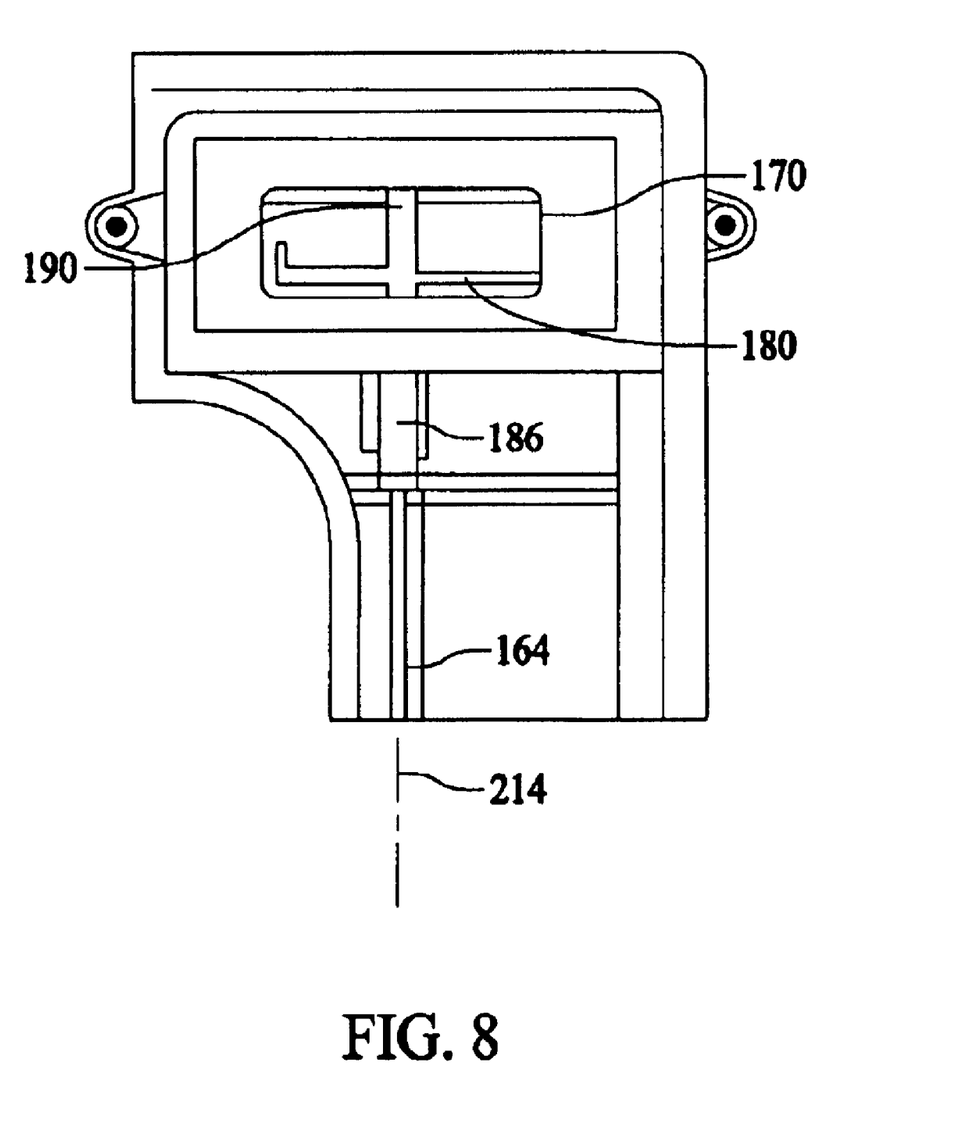
FIG. 8 is a top plan view of the damper assembly shown in FIG. 6 in an open position and with parts removed.

FIG. 8 is a top plan view of damper assembly 106 with damper 180 in an open position wherein duct member opening 170 is substantially unblocked and air flow through duct member opening 170 is generally unrestricted. Damper rim 190 is rotated nearly completely within duct member opening 192 (shown in FIG. 4) and damper wheel portion 188 does not substantially impede air flow through opening 170.

Therefore, it may be seen that damper cylindrical rim 190 extends only partly around a radial circumference from damper shaft 186 so that damper 180 is moved from fully closed to fully open positions with a relatively small rotation of control rod 164 about control rod 214, i.e., about 180 radial degrees of rotation or less. Further because of tapered side edges 210, 212 of damper rim 190, precise regulation of air flow through damper assembly 106 is achieved in intermediate positions between the open and closed positions, unlike conventional damper mechanisms.

When the refrigeration circuit is energized, evaporator air produced by the refrigeration system is introduced into freezer compartment 104 (shown in FIG. 1). The temperature of freezer compartment 104 is controlled according to damper 180 located in duct member 168 that is established in flow communication between fresh food compartment 102 and freezer compartment 104. When damper 180 is fully closed, air flow from freezer compartment 104 into fresh food compartment 102 is substantially prevented, thereby maintaining cooled evaporator air in freezer compartment 104 and accordingly lowering freezer compartment temperature. When damper 180 is fully open, an appreciable amount of air from freezer compartment 104 flows into fresh food compartment 102 from freezer compartment 104, thereby increasing the temperature of freezer compartment 104. Of course, air flow from freezer compartment 104 to fresh food compartment 102 affects the frequency at which the refrigeration circuit is energized to maintain fresh food compartment 102 temperature at a desired set temperature.

Thus, a superior damper assembly is provided in a low cost, relatively simple package. Motorized dampers and electronic controls are replaced with a simple mechanical damper, thereby reducing manufacturing costs while increasing damper performance.

While the invention has been described in terms of various specific embodiments, those skilled in the art will recognize that the invention can be practiced with modification within the spirit and scope of the claims.

What is claimed is:

1. An air flow damper assembly comprising:
   a duct member comprising a first air flow opening therethrough; and
   a damper disposed within said duct member and comprising a substantially cylindrical rim for regulating air flow through said first opening, one of said first air flow opening and said damper including a tapered edge.

2. A damper assembly in accordance wit claim 1 further comprising a control rod for positioning said rim relative to said first opening, said rod comprising a longitudinal axis, said rim extending radially from said axis.

3. A damper assembly in accordance wit claim 2 further comprising a control knob coupled to said rod, said knob extending radially about said axis.

4. A damper assembly in accordance with claim 3 further comprising a body, said knob extending partially through said body.

5. A damper assembly in accordance with claim 1 further comprising a body comprising a second air flow opening therethrough, said damper selectively positionable between an open position and a closed position, said damper substantially blocking air flow through said second opening when said damper is in said closed position, said damper substantially unobstructing air flow through said second opening when said damper is in said open position.

6. A damper assembly in accordance with claim 1 wherein said rim comprises a first edge and a second edge extending oppositely to one another, one of said rim edges tapered.

7. An air flow assembly for a refrigerator including a fresh food compartment and a freezer compartment, said air flow assembly comprising:
   a duct portion comprising a first air flow opening therethrough and adapted for flow communication between the fresh food compartment and the freezer compartment; and
   a damper in flow communication with said duct portion, said damper comprising a shaft and a substantially cylindrical rim extending radially from said shaft, said rim positionable with respect to said opening by rotating said shaft to regulate air flow through said first opening, one of said first air flow opening and said damper including a tapered edge.

8. An air flow assembly in accordance with claim 7 wherein said rim is tapered.

9. An air flow assembly in accordance with claim 7 further comprising a body and a control knob coupled to said body, said control knob coupled to said shaft.

10. An air flow assembly in accordance with claim 7 further comprising a body comprising a second air flow opening, said second air flow opening extending substantially perpendicular to said first air flow opening.

11. An air flow assembly in accordance with claim 7, said shaft comprising a longitudinal axis, said rim rotatable between an open position and a closed position about said longitudinal axis, said rim comprising a width substantially equal to a width of said first air flow opening when in said closed position, said rim width substantially less than said opening width in said open position.

12. A refrigerator comprising:
    a freezer compartment;
    a fresh food compartment; and
    an air flow assembly comprising a duct portion in flow communication with said freezer compartment and said fresh food compartment, and a damper comprising a longitudinal axis and a radially extending rim rotatable about said longitudinal axis, one of said duct portion and said damper including a tapered edge.

13. A refrigerator in accordance with claim 12, said duct portion comprising a substantially cylindrical opening about said damper, said rim comprising a width substantially equal to a width of said opening when said damper is an open position.

14. A refrigerator in accordance with claim 12, said duct portion comprising a substantially cylindrical opening about said damper, said rim comprising a width substantially less than a width of said opening when said damper is an open position.

15. A refrigerator in accordance with claim 12, said duct portion comprising a first air flow opening in a first plane, said assembly further comprising an air flow assembly body comprising a second air flow opening in a second plane, said first plane different from said second plane.

16. A refrigerator in accordance with claim 12 further comprising an air flow control rod comprising a longitudinal axis and opposite first and second ends, said damper coupled to said first end and said control knob coupled to said second end for rotation about said longitudinal axis.

17. A refrigerator comprising:
    a freezer compartment;
    a fresh food compartment;
    a mullion separating said freezer compartment and said fresh food compartment;
    a duct member establishing flow communication between said freezer compartment and said fresh food compartment, said duct member comprising a substantially cylindrical opening accessible to said freezer compartment;
    a damper assembly located in said opening and comprising a shaft and a rim radially extending from said shaft, said rim tapered to obstruct varying portions of said opening as said shaft is rotated.

18. A refrigerator in accordance with claim 17 further comprising an air flow assembly body, said body comprising an air flow opening extending substantially perpendicular to a longitudinal axis of said damper.

19. A refrigerator in accordance with claim 17 further comprising a control rod extending from said shaft and a control knob coupled to said shaft, said rim rotating about said axis as said knob is rotated about said axis.

20. A refrigerator in accordance with claim 19, said damper selectively positionable between an open position and a closed position to regulate air flow from said freezer compartment to said refrigerator compartment.

* * * * *